US005368946A

United States Patent [19]
Bohme et al.

[11] Patent Number: 5,368,946
[45] Date of Patent: Nov. 29, 1994

[54] PACKAGING MATERIAL HAVING A WAX COATING CONTAINING A STYRENE COPOLYMER

[75] Inventors: Reinhard D. Bohme, Riegelsville; Bobby J. Lerew, Macungie, both of Pa.

[73] Assignee: James River Paper Company, Inc., Milford, Ohio

[21] Appl. No.: 49,286

[22] Filed: Apr. 19, 1993

[51] Int. Cl.$^5$ ............................ B32B 9/04; B32B 9/06
[52] U.S. Cl. .................................... 428/484; 428/513; 428/486; 524/487
[58] Field of Search .............. 428/484, 486; 524/487

[56] References Cited
U.S. PATENT DOCUMENTS 4,063,011  12/1977  Campbell et al. ................ 526/194

Primary Examiner—James J. Seidleck
Assistant Examiner—Mary Critharis
Attorney, Agent, or Firm—Stanley M. Teigland

[57] ABSTRACT

The moisture barrier and heat seal properties of wax coatings on packaging materials are improved by blending with the wax from about 5 to 15 percent of a styrene/ethylene-butylene/styrene block copolymer.

16 Claims, No Drawings

PACKAGING MATERIAL HAVING A WAX COATING CONTAINING A STYRENE COPOLYMER

This invention is a packaging material having a wax coating that provides superior moisture barrier properties and heat seal properties.

Packaging materials having a wax coating are used in such applications as liners for packaging cereal. Normal wax coatings provide good moisture barrier but do not form a heat seal. It is known in the art that the addition of an ethylene-vinyl acetate copolymer (EVA), together with a tackifier resin, to the wax imparts heat seal properties to the coating, but at the same time the EVA reduces the moisture barrier of the coating. This invention provides a wax coating having good heat seal properties as well as good moisture barrier properties.

The packaging material of this invention comprises a substrate having a coating comprising a blend of from about 85 to 95, preferably 88 to 92, percent of a hydrocarbon wax and from about 5 to 15, preferably 7 to 10, percent of a styrene/ethylene-butylene/styrene block copolymer. The blend may also contain from about zero to three, preferably one to two, percent of a tackifier resin.

The coating is applied to both sides of the substrate in accordance with conventional methods. The coating preferably has a basis weight between about 6.5 and 13 grams per square meter (4 to 8 pounds per ream) per side, corresponding to a thickness between about 0.25 and 0.55 mil, which is typical for a wax coating. The coating preferably has a water vapor transmission rate (WVTR) of less than about 0.07 gram/100 square inches/24 hours. In preferred embodiments the WVTR is between about 0.04 and 0.07 when the material is tested flat. When the material is tested creased, the WVTR is between about 0.2 and 0.5, which indicates that the coating is better able to withstand flexing and abrasion than coatings of the prior art. For example, a comparable material having a wax coating containing EVA has a WVTR between about 0.05 and 0.16 when tested flat and between about 0.5 and 1.6 when tested creased. The coating of this invention also forms a better heat seal. When heat sealed to itself at a temperature of 121° C. for 0.5 second at a pressure of 20 pounds per square inch gauge on a Sentinel heat sealer, flat bar with rubber pad backing (conventional heat sealing conditions), the coating forms a heat seal having a strength of at least 50 grams per inch. In preferred embodiments, the heat seal strength is between about 60 and 100 grams per inch.

The wax in the coating is preferably a paraffin wax. However, a synthetic polyethylene wax, preferably one having a molecular weight between about 300 and 800, may be substituted for the paraffin wax.

Styrene/ethylene-butylene/styrene block copolymers suitable for use in the coating are available commercially from Shell Chemical Company under the designation Kraton G. The preferred copolymer is Kraton G-1652, which has an ethylene-butylene content of 71 percent. The ethylene-butylene content may range from about 65 to 90, preferably 65 to 75, percent. Styrene/ethylene-butylene/styrene block copolymers are referred to in U.S. Code of Federal Regulations Section 177.1810(a)(3) of Title 21 as styrene block copolymers with 1,3-butadiene, hydrogenated. The block copolymers are thermoplastic elastomers that may be extruded into sheet, film, tubing and the like. It is known that the copolymers may be blended with wax, but in the blends of the prior art the concentration of the copolymer is higher, generally above twenty percent, than it is in this invention.

The tackifier resin may be any tackifier resin conventionally used in wax coatings, such as alpha-methyl styrene resins, terpene resins and hydrogenated petroleum hydrocarbon resins.

The substrate onto which the coating is coated is preferably flexible, such as paper having a basis weight between about 45 and 65 grams/square meter (28 to 40 pounds per ream). The basis weight of the packaging material of the invention is preferably between about 58 and 90 grams/square meter (36 to 55 pounds/ream).

The following example illustrates the best mode contemplated for practicing the invention. All percentages are by weight in the example as well as elsewhere herein.

EXAMPLE

Paper having a basis weight of 53.5 grams per square meter (33 pounds per ream) was coated with a composition comprising 89 percent paraffin wax (Chevron 4042), 9 percent styrene/ethylene-butylene/styrene block copolymer (Kraton G-1652), and 2 percent tackifier resin (Nirez). The composition, which was applied at a temperature of 110° C., formed a coating having a basis weight of 21 grams per square meter. The coated paper had a WVTR of 0.04 when tested flat and a WVTR of 0.25 when tested creased. The coated paper was formed into a pouch, filled with cereal, and heat sealed on a pneumatic scale sacker. The heat seal of the top seal (closure) had a bond strength of 50 grams per inch. This Example illustrates the excellent suitability of the packaging material of the invention to form a package for cereal or other food wherein the package has good moisture barrier properties and heat seal properties suitable for forming easy-to-open top seals.

I claim:

1. Packaging material comprising a substrate having a coating comprising a blend of from about 85 to 95 percent of a hydrocarbon wax and 5 to 15 percent of a styrene/ethylene-butylene/styrene block copolymer.

2. The material of claim 1 wherein the coating has a water vapor transmission rate of less than about 0.07 gram/100 square inches/24 hours when tested flat and less than about 0.5 gram/100 square inches/24 hours when tested creased.

3. The material of claim 2 wherein the material forms a coating-to-coating heat seal having a strength of at least 50 grams per inch when the material is heat sealed at a temperature of 121° C. for 0.5 second at a pressure of 20 pounds per square inch gauge.

4. The material of claim 1 wherein the wax is a paraffin wax.

5. The material of claim 1 wherein the coating contains from one to two percent of a tackifier resin.

6. The material of claim 1 wherein the ethylene-butylene content of the block copolymer is 65 to 90 percent.

7. The material of claim 1 wherein the substrate is flexible.

8. The material of claim 1 wherein the substrate is paper.

9. The material of claim 1 wherein the coating has a basis weight between about 6.5 and 13 grams per square meter per side.

10. The material of claim 9 having a basis weight between about 58 and 90 grams per square meter.

11. The material of claim 1 formed into a heat sealed package.

12. Packaging material comprising paper having a coating comprising a blend of from about 85 to 95 percent of paraffin wax and 5 to 15 percent of a styrene-/ethylene-butylene/styrene block copolymer, the coating having a water vapor transmission rate of less than about 0.07 gram/100 square inches/24 hours when tested flat and less than about 0.5 gram/100 square inches/24 hours when tested creased, and the material forming a coating-to-coating heat seal having a strength of at least 50 grams per inch when the material is heat sealed at a temperature of 121° C. for 0.5 second at a pressure of 20 pounds per square inch gauge.

13. The material of claim 12 wherein the ethylene-butylene content of the block copolymer is 65 to 75 percent.

14. The material of claim 13 wherein the coating contains from one to two percent of a tackifier resin.

15. The material of claim 14 having a basis weight between about 58 and 90 grams per square meter.

16. The material of claim 15 formed into a heat sealed package.

* * * * *